Nov. 25, 1952  W. E. JACKSON  2,619,015
FILM TONER APPARATUS
Filed Oct. 14, 1949  3 Sheets-Sheet 1
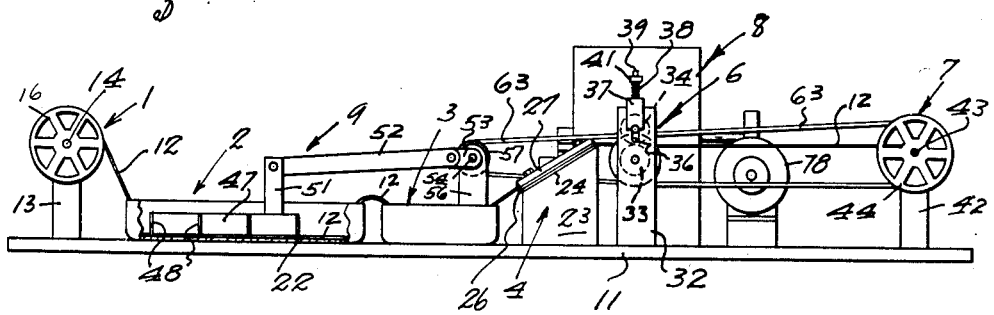
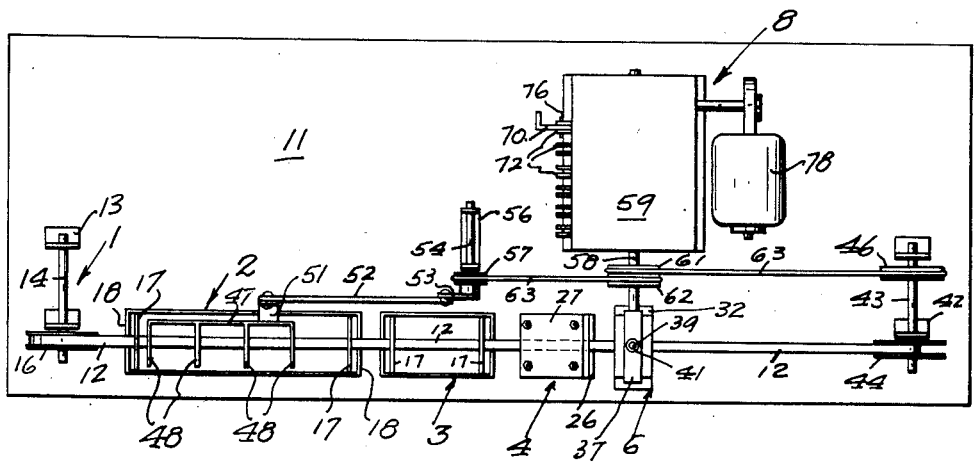
INVENTOR.
WILFRED E. JACKSON
BY George B. White
ATTORNEY Nov. 25, 1952 — W. E. JACKSON — 2,619,015
FILM TONER APPARATUS
Filed Oct. 14, 1949 — 3 Sheets-Sheet 2

INVENTOR.
WILFRED E. JACKSON
BY George B White
ATTORNEY

Nov. 25, 1952 W. E. JACKSON 2,619,015
FILM TONER APPARATUS
Filed Oct. 14, 1949 3 Sheets-Sheet 3
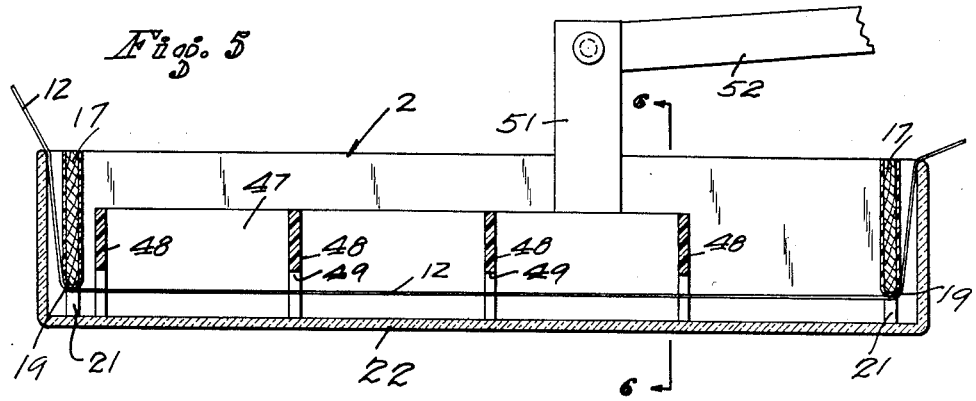
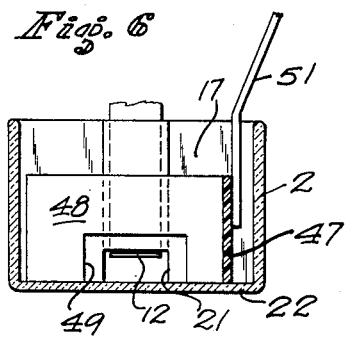
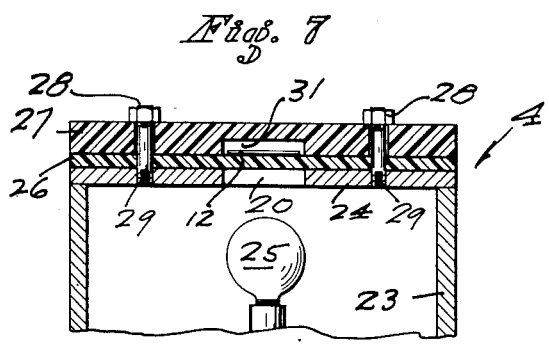
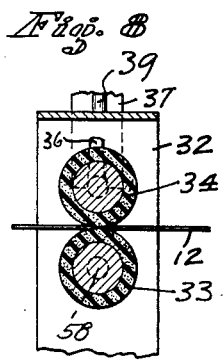
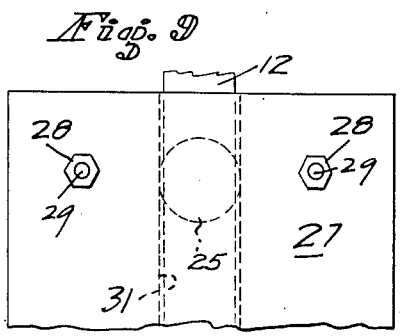
INVENTOR.
WILFRED E. JACKSON
BY George B White
ATTORNEY Patented Nov. 25, 1952

2,619,015

UNITED STATES PATENT OFFICE 2,619,015

FILM TONER APPARATUS

Wilfred E. Jackson, Richmond, Calif.

Application October 14, 1949, Serial No. 121,273

5 Claims. (Cl. 95—94)

This invention relates to an apparatus for toning photographic films.

My invention is particularly adapted for toning long lengths of photographic films, and to distribute the dye evenly at all times. The device is also easily adjustable for various selected speeds according to the type of dye or film used.

In general the toning of a photographic film involved the immersing of the film into a dye solution so as to soften the emulsion on the film sufficiently for absorbing the dye. Some films respond to dye faster than other films. Also colors or dyes or toners respond at various different speeds. The devices and methods used in the past resulted in uneven toning.

Features of my invention include: the continuous feeding of a film through a solution at a uniform selected speed; the agitating of the solution in synchronism with the motion of the film through the solution; the guiding of the film in single layer through the solution while the solution is maintained at uniform strength; variable, quickly adjustable driving mechanism for the pulling of the film, for the agitator and for the take up reel, to compensate for the variation in the action of the dye solution on the film; and guides which are easily interchangeable for films of different sizes.

It will be understood that various changes in the details of construction may be made without departing from the spirit or scope of the invention as defined by the appended claims.

With the foregoing and other objects in view, which will be made manifest in the following detailed description, reference is had to the accompanying drawings for the illustrative embodiment of the invention, wherein:

Fig. 1 is a side view of my device.

Fig. 2 is a top plan view of my device.

Fig. 5 is a fragmental sectional view longitudinally through the pan.

Fig. 6 is a cross sectional view through the lines 6—6 of Fig. 5.

Fig. 7 is a fragmental sectional view of the film guide.

Fig. 8 is a fragmental cross sectional view of the rollers for pulling the film, and Fig. 9 is a fragmental top plan view of the film guide.

Figure 3:
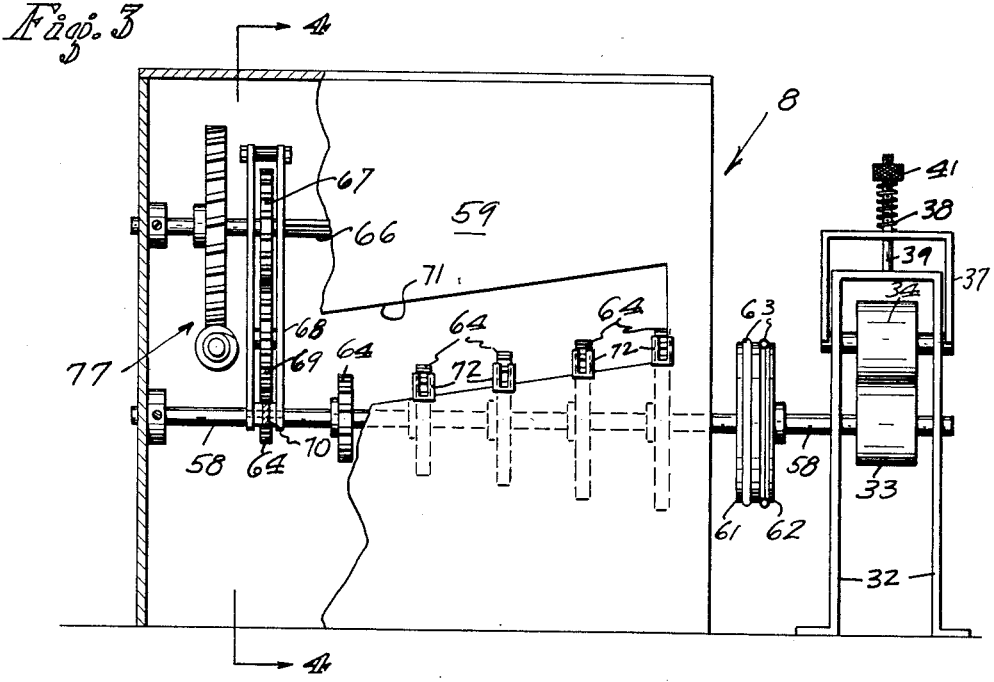
Fig. 3 is an end view of the device, viewing the transmission, the casing being partly broken away.
Figure 4:
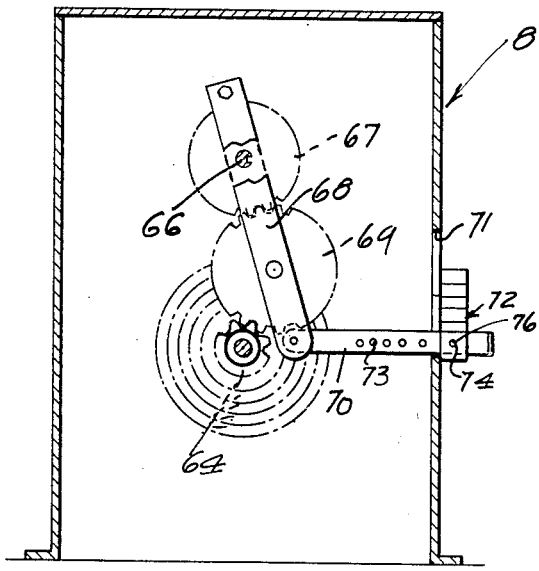
Fig. 4 is a sectional view on the lines 4—4 of Fig. 3.

In its general organization my device includes a reel holder 1 for the film to be toned, a dye tray 2, a rinse tray 3, a film guide device 4, a film pulling device 6, and a take up device 7 arranged in series for generally straight line moving of the film. A variable speed drive mechanism 8 is connected to the film pulling device 6 and to the take up device 7, and it also drives an agitator 9 in the dye tray 2.

The aforesaid devices are preferably mounted on a single base 11 to form a unitary apparatus, the components of which work in synchronism and in such co-ordination that a film 12 is immersed in a uniform solution for the optimum period necessary for the proper toning.

The reel holder 1 includes a bracket 13, with the usual spindle shaft 14 in its upper end, to rotatably support a film reel 16.

The dye tray 2 is preferably of oblong shape and wider than the width of the usual film. In each end of the tray 2 is a cross guide 17, suitably spaced from the adjacent end wall 18 of the tray 2. Each cross guide 17 may be made of any suitable material, but is preferably covered by a plastic jacket 19 suitably rounded for guiding the film without scratching it. Each cross guide 17 has in its lower edge a guide recess 21 opposite to and spaced above the bottom 22 of the tray 2, for holding the film 12 near the tray bottom 22. The dye tray 2 is preferably made of transparent material with rounded top edges to permit observation and to prevent scratching of the film. The dye tray 2 contains a suitable dye solution to above the level of the guide recess 21.

The rinse tray 3 contains a rinsing liquid and is provided near its ends with cross guides 17 similar to the cross guides 17 in the dye tray 2 for holding the film 12 under the rinsing liquid. The tray 3 is in axial line alignment with the dye tray 2.

The film guide device 4 is in alignment with the end of the rinse tray 3 and includes a block 23 the top 24 of which is inclined upwardly away from the rinse tray 3. On this inclined top 24 is a guide base 26 having a smooth top surface. A guide top 27 is detachably held upon said top surface by suitable nuts 28 on bolts 29 anchored in the block 23. It is to be noted that the block 23 is hollow. The underface of the guide top 27 has a longitudinal groove 31 in it which with the top surface of the guide base 26 forms a guide channel inclined upwardly and away from the rinsing tray 3 for guiding the film 12 from said rinsing tray 3 to said film pulling device 6. The guide base 26 and the guide top 27 are preferably of transparent material, for instance so called Lucite, or other plastic for allowing observation of the film as it passes therethrough. In the top of the hollow block 23 is an aperture 29 through which is admitted light from an electric bulb 25 within the block 23 for observing the degree of toning.

The film pulling device 6 includes a journal frame 32 on the base 11, which supports a drive roller 33 and an idler roller 34 in contact with one another so that the line of contact between said rollers is generally aligned with the higher end of the film guide 4. The idler roller 34 is above the drive roller 33 and is journalled slidably in vertical slots 36. A yoke 37 straddling the top of the roller frame 32 is pressed against the journal shaft ends of the idler roller 34 by a coil spring 38, which latter is located around a rod 39 extended from the top of the roller frame 32 and through the yoke 37. The coil spring 38 is between the yoke 37 and an adjusting nut 41 so that the roller pressure on the film can be readily regulated by turning the adjusting nut 41. The drive roller 33 is driven by said drive mechanism 8.

The take up device 7 includes a bracket frame 42 on the spindle 43 of which is held the take up reel 44. The spindle 43 has a suitable pulley 46 thereon for transmitting take-up rotation to the reel 44.

The agitator 9 is in the dye tray 2 and includes a flat side bar 47 parallel with and adjacent to one side of the dye tray 2. A plurality of spaced transverse vanes 48 extend at right angles from the side bar 47 and across the dye tray 2. Each vane 48 has a recess 49 in its lower edge aligned with the film guide recesses 21 of the cross guides 17 in said tray. Said vanes 48 are located between said cross guides 17 and are spaced from said cross guides 17 to permit reciprocation in the dye tray 2. The vane recesses 49 are considerably larger than the average largest film that may be toned in the apparatus and are also larger than the guide recesses 21 to permit longitudinal reciprocation of the agitator without injuring the film 12 passing thereunder. The vanes 48 rest upon the tray bottom 22 so as to prevent the settling of the dye and to maintain the solution uniform throughout the dye tray 2. A handle 51 extends upwardly from the side bar 47. A link 52 is pivotally connected at one end thereof to the top of the handle 51 and at its other end to a crank arm 53. A crank shaft 54 journalled in a crank frame 56 has on it a suitable pulley 57 for driving connection to the driving mechanism 8.

The drive mechanism 8 is of a suitable variable speed type and is adapted for quick adjustment of speeds according to the toning result desired. A driven shaft 58 is journalled in transmission casing 59 and is directly driving the drive roller 33. On this driven shaft 58 are a pair of suitable drive pulleys 61 and 62 connected by suitable drive belts 63 respectively to the pulley 46 and 57 for driving the take up reel 44 and the agitator crank shaft 54. It is to be noted that the ratio between the pulleys 46 and 57 and the pulleys 61 and 62 respectively determine the synchronized speed ratio between the take up, and the agitator and the film pulling devices.

In the present illustration the speed shifting is facilitated by a variable gear transmission. A series of gears 64 of consecutively increasing diameter are fixed in spaced relation along the driven shaft 58. A drive shaft 66 is journalled in the casing 59 parallel with the driven shaft 58 and has thereon a slidable drive gear 67. A yoke frame 68 straddles the drive gear 67 and is also slidable along the drive shaft 66. The yoke frame 68 is journalled on the drive shaft 66. An idler transmission gear 69 journalled in the yoke frame 68 is in constant mesh with the drive gear 67 but it is swingable about the latter with yoke frame 68 and into and out of mesh with the respective driven gears 64. A pivoted handle 70 extends from the end of the yoke frame 68 adjacent and outside the idler gear 69, and through an inclined slot 71 to the outside of the casing 59. Along the lower edge of the slot 71 are a plurality of spaced keepers 72 into which fits the pivoted gear shaft handle 70. Each keeper 72 is aligned with one of said driven gears 64 so as to hold the handle 70 and the yoke frame 68 in registry with the selected driven gear 64. For shifting gears, the handle 70 is raised out of a keeper 72 and pulled up so as to pull the idler gear 69 away from the driven gear 64. Then the handle 70 is pulled along the slot 71 until it is in registry with another keeper 72 in alignment with the selected driven gear 64, and there the handle 70 is pulled down into the latter keeper 72 and pushed in to hold the gears in mesh. A series of spaced holes 73 along the handle 70 are in respective registry with holes 74 in the keepers 72 to accommodate a pin 76 for holding the respective gears in selected driving relation.

Power is transmitted to the drive 66, in the herein illustration, by a worm and gear transmission 77 driven by an electric motor 78.

I claim:

1. In a film toner apparatus, a vessel containing a dye solution, means to pull the film into and out of said vessel through said solution along the bottom of the vessel, and an agitator in the vessel to maintain said dye solution uniform throughout the vessel, a plurality of vanes on said agitator straddling said film, each vane having a recess in its bottom edge surrounding the top and side edges of said film and extending substantially to said bottom; and means to reciprocate said agitator longitudinally along said bottom and in synchronism with said film pulley means.

2. In a film toner apparatus, a pan having a dye solution therein, guides in the pan spaced from each end thereof, each guide having a guide recess in its bottom edge above the bottom of the pan to guide and hold the film near the pan bottom, spaced agitator vanes in the pan extending across above said film and substantially adjacent to said bottom, each vane having a recess in its bottom edge larger than said guide recesses and aligned with the latter to be spaced from the top and edges of said film, and a device for reciprocating said vanes longitudinally in said pan and between said guides.

3. In a film toner apparatus, a dye pan containing a dye solution, a rinse pan containing a rinsing liquid and aligned contiguously with the dye pan, transverse retaining guides in said dye pan and in said rinse pan to guide the film under said solution and under said liquid respectively, a film reel holder at an end of the dye pan farthest from said rinse pan, an upwardly inclined film guide aligned and contiguous with said rinse pan, pulling rollers aligned with said film guide, a take-up reel aligned with said pulling rollers, and adjustable speed driving device for said pulling rollers and for said take up reel.

4. In a film toner apparatus, a dye pan containing a dye solution, a rinse pan containing a rinsing liquid and aligned contiguously with the dye pan, transverse retaining guides in said dye pan and in said rinse pan to guide the film under said solution and under said liquid respectively, a film reel holder at an end of the dye pan farthest from said rinse pan, an upwardly inclined film guide aligned and contiguous with said rinse pan, pulling rollers aligned with said film guide, a take-up reel aligned with said pulling rollers, and adjustable speed driving device for said pulling rollers and for said take up reel, a longitudinally reciprocable agitator in the dye pan, and reciprocating connections between said agitator and said driving device for reciprocating said agitator in the dye solution in synchronism with the adjusted driving speed.

5. In a film toner apparatus, a dye pan containing a dye solution, a rinse pan containing a rinsing liquid and aligned contiguously with the dye pan, transverse retaining guides in said dye pan and in said rinse pan to guide the film under said solution and under said liquid respectively, a film reel holder at an end of the dye pan farthest from said rinse pan, an upwardly inclined film guide aligned and contiguous with said rinse pan, pulling rollers aligned with said film guide, a take-up reel aligned with said pulling rollers, and adjustable speed driving device for said pulling rollers and for said take-up reel, a longitudinally reciprocable agitator in the dye pan, and reciprocating connections between said agitator and said driving device for reciprocating said agitator in the dye solution in synchronism with the adjusted driving speed, said agitator including vanes movable along the dye pan adjacent said film to maintain said dye solution uniform about said film.

WILFRED E. JACKSON.

REFERENCES CITED

The following references are of record in the file of this patent:

UNITED STATES PATENTS

| Number | Name | Date |
|---|---|---|
| 1,560,541 | Capstaff | Nov. 10, 1925 |
| 2,077,081 | Tondreau et al. | Apr. 13, 1937 |
| 2,110,356 | Cunningham | Mar. 8, 1938 |
| 2,461,419 | Forgett | Feb. 8, 1949 |

FOREIGN PATENTS

| Number | Country | Date |
|---|---|---|
| 18,852 | Great Britain | of 1913 |